(12) United States Patent
Lin et al.

(10) Patent No.: US 10,904,198 B2
(45) Date of Patent: Jan. 26, 2021

(54) INFORMATION SENDING METHOD, INFORMATION DISPLAY METHOD, TERMINAL, SERVER, SYSTEM, AND STORAGE MEDIUM

(71) Applicant: TENCENT TECHNOLOGY (SHENZHEN) COMPANY LIMITED, Shenzhen (CN)

(72) Inventors: Feng Lin, Shenzhen (CN); Wentao Wang, Shenzhen (CN); Zhongbao Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/511,675

(22) Filed: Jul. 15, 2019

(65) Prior Publication Data

US 2019/0342254 A1 Nov. 7, 2019

Related U.S. Application Data

(63) Continuation of application No. PCT/CN2018/081538, filed on Apr. 2, 2018.

(30) Foreign Application Priority Data

Apr. 28, 2017 (CN) .......................... 2017 1 0296527

(51) Int. Cl.
*G06F 15/16* (2006.01)
*H04L 12/58* (2006.01)

(52) U.S. Cl.
CPC .............. *H04L 51/32* (2013.01); *H04L 51/04* (2013.01); *H04L 51/10* (2013.01); *H04L 51/26* (2013.01); *H04L 51/30* (2013.01); *H04L 51/34* (2013.01)

(58) Field of Classification Search
CPC ......... H04L 51/32; H04L 51/04; H04L 51/10; H04L 51/26; H04L 51/30; H04L 51/34; H04M 1/725
See application file for complete search history.

(56) References Cited

U.S. PATENT DOCUMENTS 9,654,622 B1 * 5/2017 Cohen ..................... H04L 51/24
2006/0168028 A1 7/2006 Duxbury et al.
(Continued)

FOREIGN PATENT DOCUMENTS

CN 1330770 A 1/2002
CN 1507236 A 6/2004
(Continued)

OTHER PUBLICATIONS

The World Intellectual Property Organization (WIPO) International Search Report for PCT/CN2018/081538 dated Jul. 4, 2018 5 Pages (including translation).
(Continued)

*Primary Examiner* — John B Walsh
(74) *Attorney, Agent, or Firm* — Anova Law Group, PLLC

(57) ABSTRACT

An information sending method includes displaying, by a first social client, an expectation message sending control on a user interface. The expectation message sending control corresponds to at least one second social client. The method also includes receiving a trigger signal for the expectation message sending control; and sending an expectation message to a server according to the trigger signal, which includes an identifier of the at least one second social client, to cause the server to forward the expectation message to the at least one second social client. The method also includes, after receiving the expectation message forwarded by the server, displaying, by each second social client, prompt information according to the expectation message, and the (Continued)

prompt information being used to indicate that the first social client is waiting for the second social client to send a social-network message to the first social client.

20 Claims, 10 Drawing Sheets

(56) References Cited

U.S. PATENT DOCUMENTS

| | | | |
|---|---|---|---|
| 2008/0133685 | A1 | 6/2008 | Boss et al. |
| 2011/0131325 | A1 | 6/2011 | Piccionelli et al. |
| 2014/0195626 | A1 | 7/2014 | Ruff et al. |
| 2015/0163258 | A1 | 6/2015 | Garcia et al. |
| 2015/0382138 | A1 | 12/2015 | Bose et al. |
| 2016/0294833 | A1* | 10/2016 | Wu ............... H04L 63/101 |
| 2017/0039204 | A1* | 2/2017 | Blanchflower ....... G06F 16/215 |

FOREIGN PATENT DOCUMENTS

| | | |
|---|---|---|
| CN | 103874019 A | 6/2014 |
| CN | 103888600 A | 6/2014 |
| CN | 104796324 A | 7/2015 |
| CN | 105164663 A | 12/2015 |
| CN | 105897561 A | 8/2016 |
| CN | 106161188 A | 11/2016 |
| CN | 106464574 A | 2/2017 |

OTHER PUBLICATIONS

The State Intellectual Property Office of the People's Republic of China (SIPO) Office Action 1 for 201710296527.7 dated Dec. 27, 2019 14 Pages (including translation).

Taiwan Intellectual Property Office Examination report for Application No. 10721167270 dated Dec. 11, 2019 10 pages (including translation).

* cited by examiner

INFORMATION SENDING METHOD, INFORMATION DISPLAY METHOD, TERMINAL, SERVER, SYSTEM, AND STORAGE MEDIUM

RELATED APPLICATION

This application is a continuation application of PCT Patent Application No. PCT/CN2018/081538, filed on Apr. 2, 2018, which claims priority to Chinese Patent Application No. 201710296527.7, entitled "INFORMATION SENDING METHOD, INFORMATION DISPLAY METHOD, TERMINAL, SERVER, SYSTEM, AND STORAGE MEDIUM", filed with the Chinese Patent Office on Apr. 28, 2017, content of all of which is incorporated herein by reference in its entirety.

FIELD OF THE TECHNOLOGY

The present disclosure relates to the field of Internet technologies and, in particular, to an information sending method, an information display method, a terminal, a server, a system, and a storage medium.

BACKGROUND OF THE DISCLOSURE

With continuous development of Internet technologies, an increasing number of social applications (or Application, App) emerge as the time goes on. Different users are in a closer relationship by exchanging information using the social applications.

Using an example in which social applications are instant messaging applications, a procedure of exchanging information by users using instant messaging applications includes: A user A selects, from a contact list of an instant messaging application, a user B with whom the user A needs to exchange information, and sends, by using the instant messaging application, instant messaging information to an instant messaging application used by the user B; and the instant messaging application used by the user B displays the received instant messaging information, and sends feedback information inputted by the user B to the instant messaging application used by the user A, to exchange the information of the users.

However, in such approaches, the success rate of exchanging information between social applications is relatively low. The disclosed methods and systems are directed to solve one or more problems set forth above and other problems.

SUMMARY

According to a first aspect of the embodiments of the present invention, an information sending method is provided. The method includes displaying, by a first social client, an expectation message sending control on a user interface. The expectation message sending control corresponds to at least one second social client. The method also includes receiving a trigger signal for the expectation message sending control; and sending an expectation message to a server according to the trigger signal, which includes an identifier of the at least one second social client, to cause the server to forward the expectation message to the at least one second social client. The method also includes, after receiving the expectation message forwarded by the server, displaying, by each second social client, prompt information according to the expectation message, and the prompt information being used to indicate that the first social client is waiting for the second social client to send a social-network message to the first social client.

According to a second aspect of the embodiments of the present invention, an information display system is provided. The information exchange system includes a first terminal, a second terminal, and a server. The first terminal is configured to perform: displaying, by a first social client, an expectation message sending control on a user interface, the expectation message sending control corresponding to at least one second social client; receiving a trigger signal for the expectation message sending control; and sending an expectation message to a server according to the trigger signal, which includes an identifier of the at least one second social client. The server is configured to perform: forwarding the expectation message to the at least one second social client. The second terminal is configured to perform: after receiving the expectation message forwarded by the server, displaying, by each second social client, prompt information according to the expectation message, and the prompt information being used to indicate that the first social client is waiting for the second social client to send a social-network message to the first social client.

According to a third aspect of the embodiments of the present invention, a non-transitory computer-readable storage medium is provided. The computer-readable storage medium stores a computer program (an instruction), when the program (the instruction) is executed by the processor, the steps of the method according to the first aspect are implemented.

Other aspects of the present disclosure can be understood by those skilled in the art in light of the description, the claims, and the drawings of the present disclosure.

BRIEF DESCRIPTION OF THE DRAWINGS

To describe the technical solutions in the embodiments of this application more clearly, the following briefly describes the accompanying drawings. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The technical solutions in the embodiments of the present disclosure will be described in the following with reference to the accompanying drawings. It is noted that the described embodiments are only some rather than all of the embodiments of the present disclosure. All other embodiments obtained by a person of ordinary skill in the art based on the described embodiments of the present disclosure without creative efforts shall fall within the protection scope of the present disclosure.

In this specification, "a plurality of" means two or more. The term "and/or" describes an association relationship of associated objects and represents that three relationships may exist. For example, A and/or B may represent the following three cases: only A exists, both A and B exist, and only B exists. The character "/" generally indicates an "or" relationship between associated objects.

Currently, in a social application, information exchange is actively initiated by a sender according to willingness of the sender, but the information exchange initiated by the information sender may not conform with interaction willingness of an information receiver. Consequently, a success rate of exchanging information between social applications is relatively low. For example, when user B does not want to communicate with a user A, there is no response to information sent by the user A, and consequently, information cannot be exchanged between the users.

Figure 1:
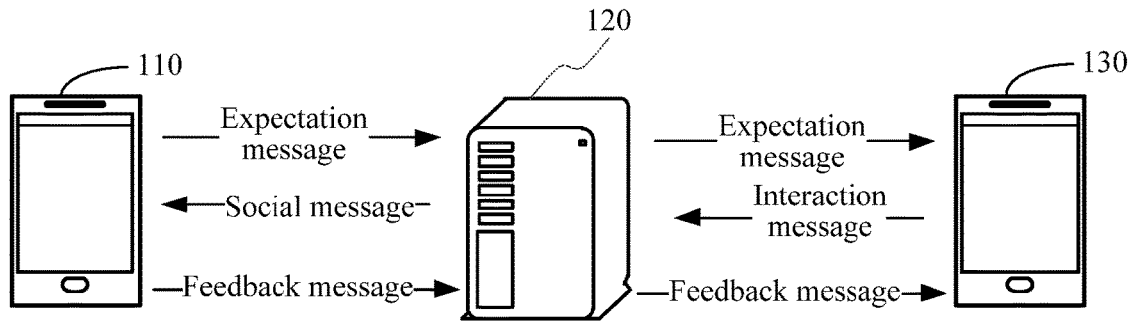
FIG. 1 is a system architectural diagram of an information exchange system according to an embodiment of the present disclosure.

FIG. 1 is a system architectural diagram of an information exchange system according to an embodiment of the present disclosure. The system includes a first terminal 110, a server 120, and a second terminal 130. Each of the first terminal 110 and the second terminal 130 is an electronic device having an Internet access function. The electronic device includes a smartphone, a tablet computer, an MP3 player, an MP4 player, a portable personal computer, or the like.

In one embodiment of the present disclosure, a social application client (or simply a social client) is installed and run on the first terminal 110 and the second terminal 130. The social client includes an instant messaging client, a microblog client, a rich media client having a social function, a video client having a social function, a shopping client having a social function, or the like. A first social client in the first terminal 110 logs in to a first social account, a second social client in the second terminal 130 logs in to a second social account, and there is a predetermined social-network relationship between the first social account and the second social account. The predetermined social-network relationship is a friend relationship, a mutual following relationship, a unidirectional following relationship, the first social account and the second social account being in a same group, or the like. The first terminal 110 and the second terminal 130 exchange information by using the social clients with an Internet access function.

The first terminal 110 and the server 120 are connected by using a wired or wireless network, and the second terminal 130 and the server 120 are connected by using a wired or wireless network. The server 120 may be one server, a server cluster including several servers, or a cloud computing center. In one embodiment of the present disclosure, the server 120 is a background server of a social client, and is configured to provide an information exchange function to a terminal in which a social client is run.

In a possible implementation scenario, when a user A (corresponding to the first social client) expects to exchange information with a user B (corresponding to the second social client), that is, the first social client is triggered to send an expectation message to the second social client by using the server 120. After receiving the expectation message, the second social client displays corresponding prompt information, and sends a social message to the first social client by using the server 120, so that the first social client sends a feedback message to the second social client according to the received social message, thereby implementing the information exchange between the social clients.

Optionally, a standard communications technology and/or protocol is used for the foregoing wireless network or the wired network. The network is usually the Internet, but may alternatively be any network, including but not limited to any combination of a local area network (LAN), a metropolitan area network (MAN), a wide area network (WAN), a mobile, wired or wireless network, a dedicated network, or a virtual private network.

For ease of descriptions, in the following embodiments, examples in which the information sending method is applied to a first social client run on the first terminal 110, the information display method is applied to the second social client run on the second terminal 130, and the information sending method is applied to the server 120 is used for description.

In existing technologies, social applications use forward social-networking. That is, after an information sender actively sends a social message, an information receiver passively receives and displays the social message. In this social-networking mode, information exchange behavior between users depends on subjective willingness of the user and have high uncertainty. When the information receiver does not want to receive the social message sent by the information sender (does not provide any feedback for the social message), only a single social message is sent and received between the information sender and the information receiver. The lack of information exchange and feedback causes relatively weak interaction between the users and affects the enthusiasm of the users to use the social applications.

However, in one embodiment of the present disclosure, reverse social-networking is used, and a new information exchange mode "expectation" is defined. In this information exchange mode, after an expecting party expresses, by sending an expectation message, its willingness to exchange information with an expected party, the expected party actively sends a social-network message to the expecting party. After receiving the social-network message, the expecting party can actively exchange information with the expected party (because the expecting party expresses the expectation, the expecting party no longer performs purely-passive receiving). According to the expectation message, both the expecting party and the expected party exchange information, improving interactive enthusiasm of the users in the social applications, and improving user stickiness.

Figure 2:
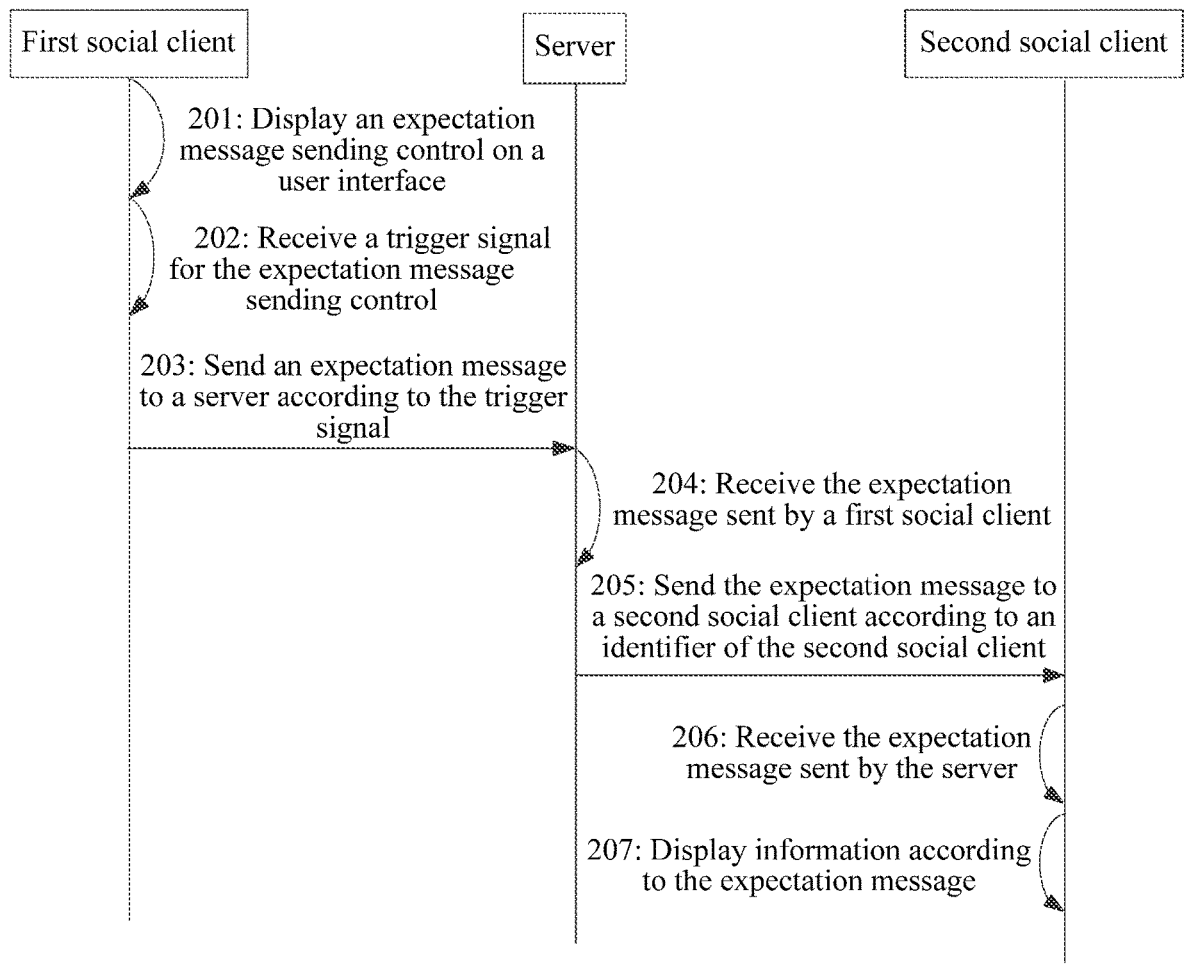
FIG. 2 is a flowchart of an information exchange method according to an embodiment of the present disclosure.

FIG. 2 is a flowchart of an information exchange method according to an embodiment of the present disclosure. In one embodiment, an example in which the information exchange method is applied to the information exchange system shown in FIG. 1 is used for description. The method includes the followings.

Step 201: A first social client displays an expectation message sending control on a user interface, the expectation message sending control corresponding to at least one second social client.

Optionally, the expectation message sending control and the second social client are in a one-to-one correspondence, that is, second social clients correspond to their respective expectation message sending controls. The first social client can send an expectation message to a specified second social client (by using a server).

In a possible implementation, the user interface displayed by the first social client includes a first list. The first list includes an identifier of the at least one second social client. Each second social client and the first social client have a predetermined social-network relationship. The predetermined social-network relationship is a friend relationship, a mutual following relationship, a unidirectional following relationship, that the second social client and the first social client are in a same group, or the like. The first list further includes the respective expectation messages sending control corresponding to the second social clients. The expectation message sending control is used to trigger the first social client to send an expectation message to the server. Optionally, the expectation message sending control is a button, a checkbox, a click box, or the like. A specific representation manner of the expectation message sending control is not limited in one embodiment of the present disclosure.

Optionally, a plurality of second social clients correspond to a same expectation message sending control. The first social client can simultaneously send, by triggering the expectation message sending control, an expectation message to the plurality of second social clients (by using the server).

In another possible implementation, the user interface displayed by the first social client includes an expectation message sending control. When a user clicks the expectation message sending control, the user interface displays the identifier of the at least one second social client to the user for selection. According to the received selection signal, the first social client simultaneously sends an expectation message to a plurality of second social clients selected by the user.

Step 202: The first social client receives a trigger signal for the expectation message sending control.

In a possible implementation, after a user who uses the first social client clicks the expectation message sending control, the first social client receives a corresponding trigger signal. The trigger signal carries the identifier of the at least one second social client corresponding to the expectation message sending control.

Step 203: The first social client sends an expectation message to the server according to the trigger signal, the expectation message including the identifier of the at least one second social client.

Different from a social-network message (such as instant messaging message in an instant messaging application) sent during communication with a social client, the expectation message in one embodiment of the present disclosure is used to indicate that a user of the second social client is being expected by the user of the first social client, and the first social client is waiting for the second social client to send a social-network message, that is, used to indicate that the second social client is in an expected state. Correspondingly, the second social client in the expected state interacts with the first social client by sending the social-network message, to release the expected state.

In a possible implementation, to enable the server and the second social client to be capable of distinguish a received message is a social-network message or an expectation message. The expectation message includes a predetermined identifier bit. The server and the second social client can distinguish the expectation message from the social-network message by detecting the predetermined identifier bit. For example, the predetermined identifier bit is set at the header of the expectation message, the server or the second social client can identify the expectation message by identifying the predetermined identifier bit at the header of the message.

The expectation message includes the identifier of the at least one second social client, and is configured to indicate the at least one second social client waited by the first social client. For example, the identifier of the second social client is a social account used for logging in to the second social client.

Optionally, the expectation message further includes at least one of a first time limit, a social-network message type, and information about an expectation site. The first time-limit is used to indicate, to the second social client, a time-limit for displaying prompt information, or may be understood as the duration in which the expectation message keeps valid in the second social client. The social-network message type is used to indicate a type of the social-network message sent by the second social client after receiving the expectation message. The expectation site is used to instruct, when current location information matches the expectation site such as a specified site or a specified area, the second social client to display the prompt information.

Optionally, the first social client stores an expectation list. The expectation list stores an identifier of each second social application client (that is, an expected party). After sending the expectation message to the server, the first social client adds the identifier of the second social client to the expectation list.

Step 204: The server receives the expectation message sent by the first social client.

In a possible implementation, after receiving the message sent by the first social client, when detecting that the message includes the predetermined identifier bit, the server determines that the received message is the expectation message. The expectation message includes the identifier of the at least one second social client.

Step 205: The server sends the expectation message to the second social client according to an identifier of each second social client.

Optionally, after determining that the expectation message is received, the server parses the received expectation message, to obtain the identifier of the at least one second social client (that is, the expected party), and forwards, according to each identifier, the expectation message to a second social client corresponding to the identifier.

Optionally, to ensure that the second social client can respond to the expectation message in time, the server detects whether the second social client is in an online state. If detecting that the second social client is in the online state, the server directly sends the expectation message to the second social client. If detecting that the second social client is in an offline state (cannot receive information in time), the server stores the expectation message, and sends the stored expectation message to the second social client when the second social client is online.

Step 206: The second social client receives the expectation message sent by the server.

In a possible implementation, the second social client receives a message sent by the server, and when detecting that the message includes the predetermined identifier bit, the second social client determines that the received message is the expectation message.

Optionally, the second social client stores an expecting party list. The expecting party list stores an identifier of each expecting party (that is, the first social client that sends the expectation message). When receiving the expectation message, the second social client in the online state stores the identifier of the first social client in the expecting party list.

Step 207: The second social client displays prompt information according to the expectation message, and the prompt information being used to indicate that the first social client is waiting for the second social client to send the social-network message.

To enable the user who uses the second social client to learn that the user is expected, to send the social-network message to the expecting party (that is, the first social client) in time according to the expectation message. The second social client generates corresponding prompt information according to the received expectation message, and displays the prompt information.

To distinguish from a conventional social-network message, a display manner of the prompt information is different from a display manner of the social-network message, that is, the prompt information is not displayed on a social-network message exchange interface between the first social client and the second social client. For example, in an example in which the social client is an instant messaging client, the prompt information is displayed on an instant messaging interface between a first instant messaging client and a second instant messaging client in a form that is not an instant messaging message. Optionally, the prompt information is displayed through notification. For example, the prompt information is displayed through notification such as pop-up window, floating window, drop-down bar, or list notification.

To avoid interference to the user caused by maliciously sent expectation messages (prompt information is frequently displayed). In a possible implementation, a receiving threshold is set in the second social client, and when a number of expectation messages that is sent by a first social client having no specified social relationship with the second social client and that is received by the second social client within a predetermined duration reaches the receiving threshold, the second social client does not display prompt information according to the expectation message any longer.

For example, when the predetermined duration is 24 hours, the specified social relationship is a mutual friend relationship, and the receiving threshold is 5, the second social client displays prompt information according to only expectation messages sent by five former non-friend social clients (that is, strangers) within 24 hours. For a subsequently received expectation message sent by a non-friend social client, the second social client does not display prompt information according to the expectation message any longer.

According to the foregoing expectation message sending mechanism, when the second social client sends the social-network message to the first social client according to the expectation message, because the first social client is waiting for the second social client to exchange information, a probability that the first social client provides a feedback according to the received social-network message is relatively high, thereby improving a success rate of exchanging information between social application clients, avoiding unidirectional sending and receiving, and improving stickiness between users in an social application.

Accordingly, in one embodiment, the first social client displays the expectation message sending control corresponding to the at least one second social client on the user interface, and receives the trigger signal for the expectation message sending control, to forward the expectation message to each of the at least one second social client by using the server, so that each second social client displays the corresponding prompt information according to the expectation message, to indicate that the first social client is waiting for the second social client to send the social-network message, to exchange information. According to the foregoing expectation message sending mechanism, the user learns from the prompt information displayed by the second social client that the user is being expected by the user of the first social client, so that the user can actively send information to the first social client for exchanging, thereby improving a success rate of exchanging information between different social clients in a social application.

To avoid impact on use by the user because the expected party is in the expected state for a long time. In a possible implementation, the expectation message sent by the first social client includes the first time-limit. Within the first time-limit, the second social client displays the corresponding prompt information according to the received expectation message, to remind the user that the user is in the expected state; releases the expected state after sending the social-network message; and stops displaying the prompt information. When the first time-limit is reached, regardless of whether the social-network message is sent, the second social client releases the expected state, and stops displaying the prompt information. A schematic embodiment is used below for description.

Figure 3A:
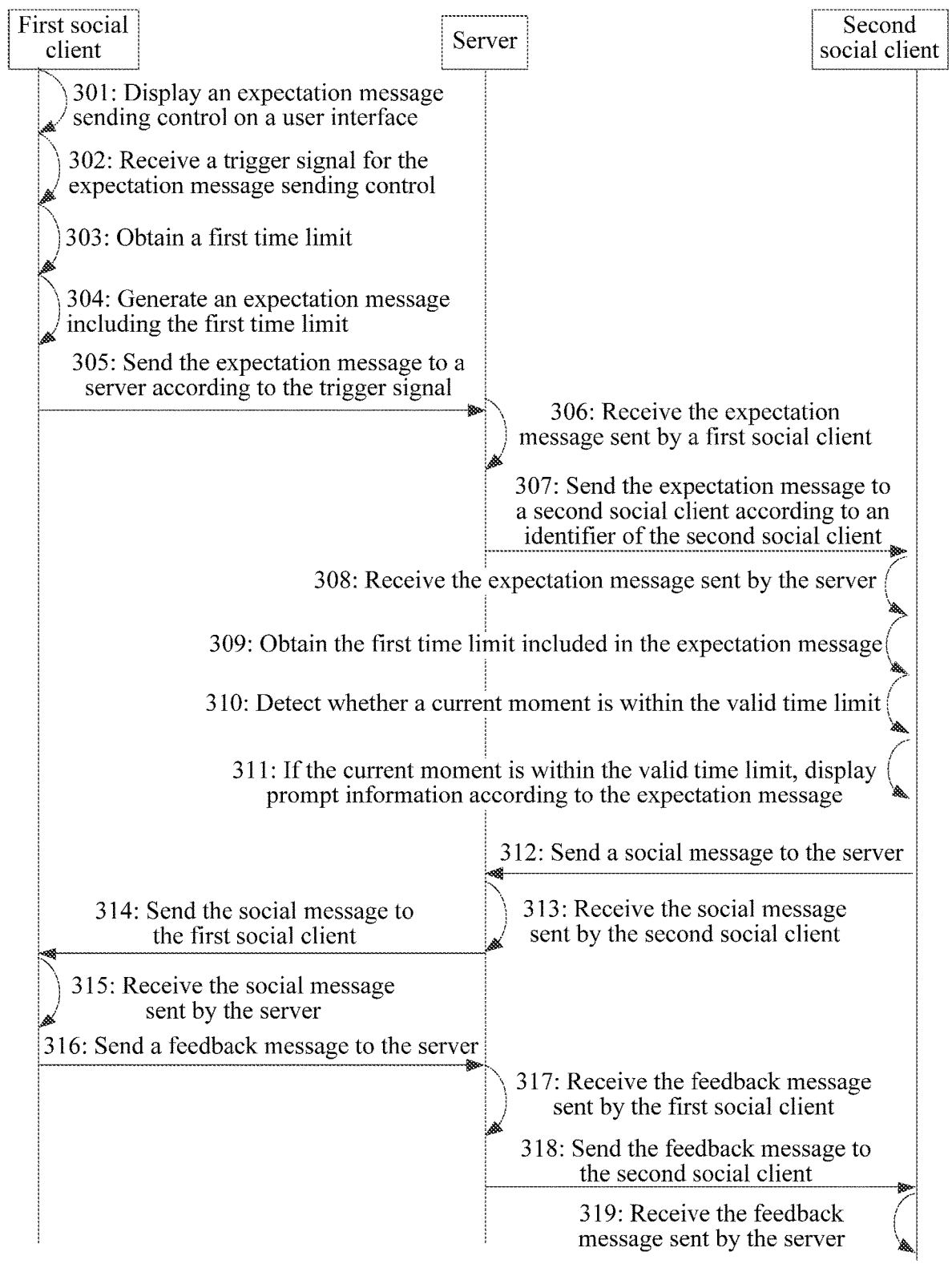
FIG. 3A is a flowchart of an information exchange method according to another embodiment of the present disclosure.

FIG. 3A is a flowchart of an information exchange method according to another embodiment of the present disclosure. In one embodiment, an example in which the information exchange method is applied to the information exchange system shown in FIG. 1 is used for description. The method includes:

Step 301: A first social client displays an expectation message sending control on a user interface, the expectation message sending control corresponding to at least one second social client.

An implementation of Step 301 is similar to that of Step 201, and details are not described in one embodiment again.

Figure 3B:
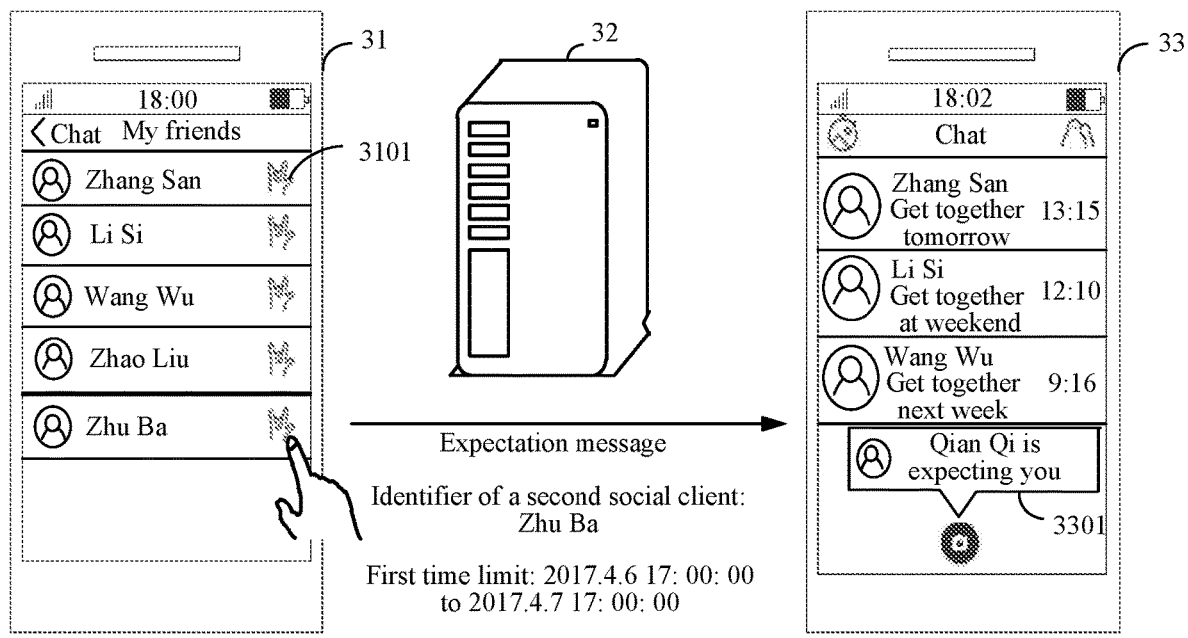
FIG. 3B is a schematic implementation diagram of sending, by a first social client, an expectation message to a second social client in the information exchange method shown in FIG. 3A.

Schematically, as shown in FIG. 3B, the user interface displayed by the first social client 31 includes a friend list. The friend list includes identifiers of several second social clients having friend relationships with the first social client 31, and the second social clients correspond to their respective expectation buttons 3101 (that is, expectation message sending controls).

Step 302: The first social client receives a trigger signal for the expectation message sending control.

Schematically, as shown in FIG. 3B, the first social client 31 receives a trigger signal for an expectation button 3101, and determines the selected and expected second social client according to the trigger signal.

Step 303: The first social client obtains a first time-limit.

Different from that the expectation message sent by the first social client includes only the identifier of the second social client, in one embodiment, the expectation message further includes the first time-limit, and the first time-limit is used to indicate, to the second social client, a time-limit for displaying prompt information.

Optionally, the first time-limit is a default value; or the first time-limit is set by a user. For example, the expectation message sending control includes a time-limit setting sub-control. When receiving the trigger signal, the first social client obtains, by using the time-limit setting sub-control, the first time-limit set by the user.

In a possible implementation, the first time-limit is set according to a moment at which the trigger signal is received and predetermined duration. The set first time-limit includes an initial display moment and a display end moment. Schematically, when the predetermined duration is 24 hours, and the first social client receives the trigger signal at 2017.4.6 17:00:00, the initial display moment is set to the moment 2017.4.6 17:00:00 at which the trigger signal is received, and the display end moment is set to a moment 2017.4.7 17:00:00 obtained after the initial display moment plus the predetermined duration. Therefore, the first time-limit included in the expectation message is from 2017.4.6 17:00:00 to 2017.4.7 17:00:00.

Step 304: The first social client generates the expectation message including the first time-limit.

The first social client generates, according to an identifier of a second social client that is indicated by the trigger signal and the obtained first time-limit, the expectation message including both the identifier of the second social client and the first time-limit.

Schematically, as shown in FIG. 3B, when receiving a click operation on an expectation button 3101 corresponding to a friend "Zhu Ba", an expectation message generated by the first social client 31 includes an identifier "Zhu Ba" of a second social client and a first time-limit 2017.4.6 17:00:00-2017.4.7 17:00:00.

Step 305: The first social client sends the expectation message to a server according to the trigger signal, the expectation message including the identifier of the second social client and the first time-limit.

Further, the first social client sends the expectation message to the second social client by using the server. The first time-limit may be written into a first time-limit field in the expectation message.

Step 306: The server receives the expectation message sent by the first social client.

Step 307: The server sends the expectation message to the second social client according to the identifier of the second social client.

In a possible implementation, the server parses the received expectation message, to obtain the identifier of the second social client and the first time-limit. When detecting that the second social client is in an online state (the second social client can immediately receive the expectation message), and a current moment is within the first time-limit, the server sends the expectation message to the second social client; or when detecting that the second social client is in an offline state (the second social client cannot immediately receive the expectation message), and a current moment is within the first time-limit, the server stores the expectation message, and sends the expectation message to the second social client when the second social client is online and an online moment is within the first time-limit.

In another possible implementation, when the current moment reaches the display end moment in the first time-limit, and detecting that the second social client is still in the offline state, the server deletes the expectation message, and returns expectation failed information to the first social client.

Step 308: The second social client receives the expectation message sent by the server.

Optionally, after receiving the expectation message, the second social client stores the expectation message by using an identifier of the first social client as an index. Schematically, expectation messages stored in the second social client is shown in Table 1.

TABLE 1

| Identifier of the first social client | Expectation message | First time-limit |
| --- | --- | --- |
| Zhang San | Expectation message A | 2017.4.5 20:00:00 to 2017.4.6 20:00:00 |
| Li Si | Expectation message B | 2017.4.6 09:00:00 to 2017.4.7 09:00:00 |
| Qian Qi | Expectation message C | 2017.4.6 11:00:00 to 2017.4.7 11:00:00 |

Step 309: The first social client obtains the first time-limit included in the expectation message.

Optionally, after receiving the expectation message, the second social client identifies the first time-limit field included in the expectation message, and reads the first time-limit of the expectation message from the first time-limit field. Schematically, as shown in FIG. 3B, a first time-limit obtained by a second social client 33 is from 2017.4.6 17:00:00 to 2017.4.7 18:00:00.

Step 310: The second social client detects whether a current moment is within the first time-limit.

Further, for the obtained first time-limit, the second social client detects whether the current moment is within the first time-limit. If the current moment is within the first time-limit, to remind a user to feed back the social-network message as soon as possible, the second social client generates and displays corresponding prompt information, and performs the following Step 311; or if the current moment is outside the first time-limit, the second social client deletes the expectation message (or the second social client sets the expectation message as invalid).

Step 311: If the current moment is within the first time-limit, the second social client displays the prompt information according to the expectation message.

For a manner of generating and displaying the prompt information, in a possible implementation, the second social client obtains the identifier of the first social client that sends the expectation message, and generates, according to a preset prompt information template, the prompt information including the identifier of the first social client, to display the prompt information by using a pop-up window, a drop-down bar, or the like.

Figure 3C:
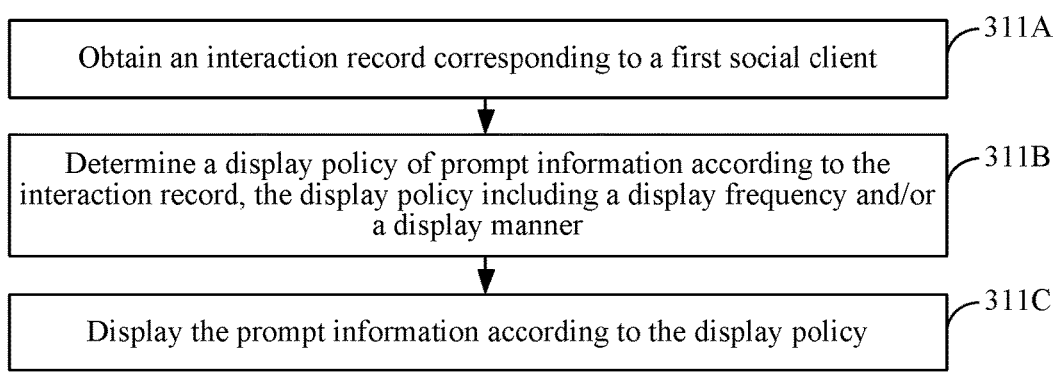
FIG. 3C is a flowchart of a process of displaying, by a second social client, prompt information.

In another possible implementation, the second social client stores a historical record of interaction with at least one first social client. When displaying the prompt information, the second social client determines a display policy of the prompt information based on the historical record of interaction with the first social client. Optionally, as shown in FIG. 3C, this Step includes the following steps.

Step 311A: The second social client obtains an interaction record corresponding to the first social client.

In a possible implementation, the second social client stores a record of interaction with at least one first social client. Each time the second social client completely exchanges information with the first social client (that is, the second social client receives a feedback message after sending a social-network message to the first social client, or the second social client returns a feedback message after receiving a social-network message sent by the first social client), the second social client updates the interaction record. The interaction record includes information such as a number of interaction times, average interaction duration, and an interaction frequency. Schematically, interaction records stored in the second social client is shown in Table 2.

TABLE 2

| Identifier of the first social client | Number of interaction times | Interaction frequency | Interaction duration |
| --- | --- | --- | --- |
| Zhang San | 8 | 2 times/day | 5 minutes |
| Li Si | 20 | 4 times/day | 12 minutes |
| Qian Qi | 10 | 3.3 times/day | 8 minutes |

After receiving the expectation message sent by the first social client, the second social client obtains the interaction record corresponding to the first social client from the interaction records shown in Table 2.

For example, according to an identifier "Qian Qi" of a first social client, a corresponding interaction record obtained by the second social client from Table 2 is that the number of interaction times is 10, the interaction frequency is 3.3 times/day, and the interaction duration is 8 minutes.

Step 311B: The second social client determines a display policy of the prompt information according to the interaction record, the display policy including a display frequency and/or a display manner.

When the interaction record indicates that the second social client and the first social client frequently interact with each other, it indicates that a success rate (or probability) of exchanging information between the second social client and the first social client is relatively high. Therefore, in a possible implementation, the second social client determines the display policy of the prompt information according to the number of interactions included in the interaction record. In another possible implementation, a second terminal alternatively determine the display policy of the prompt information according to the interaction frequency and/or interaction duration included in the interaction record.

Optionally, a larger number of interactions (or a higher interaction frequency, or longer interaction duration) indicates a higher display frequency indicated by the display policy and a more notable display manner indicated by the display policy.

Step 311C: The second social client displays the prompt information according to the display policy.

The second social client displays the prompt information according to the determined display policy.

Schematically, as shown in FIG. 3B, the second social client 33 generates prompt information 3301 "Qian Qi is expecting you" according to the identifier "Qian Qi" of the first social client 31 and the preset prompt information template, and displays the prompt information 3301 by using a pop-up window at a display frequency of 5 minutes/time.

According to the foregoing steps 301 and 311, the first social client and the second social client complete a process of sending the expectation message and displaying the prompt information. After viewing the prompt information, the user who uses the second social client learns that the user is expected by the user who uses the first social client, and may exchange information with the first social client by sending the social-network message. Optionally, as shown in FIG. 3A, when the second social client exchanges information with the first social client according to the prompt information, the following steps are included.

Step 312: The second social client sends the social-network message to the server.

To release the expected state, the second social client sends, according to the received expectation message, the social-network message to the first social client by using the server, to initiate the information exchange with the first social client.

Optionally, when the received expectation message includes the first time-limit, the second social client sends the social-network message to the server within the first time-limit, and sets the expectation message into an invalid state after sending the social-network message, to avoid interference to the user caused by displaying the prompt information again subsequently.

For obtaining the social-network message, in a possible implementation, when the received expectation message further includes a social-network message type, the second social client provides a corresponding information acquisition control according to the social-network message type, to obtain the social-network message by using the information acquisition control.

Figure 3D:
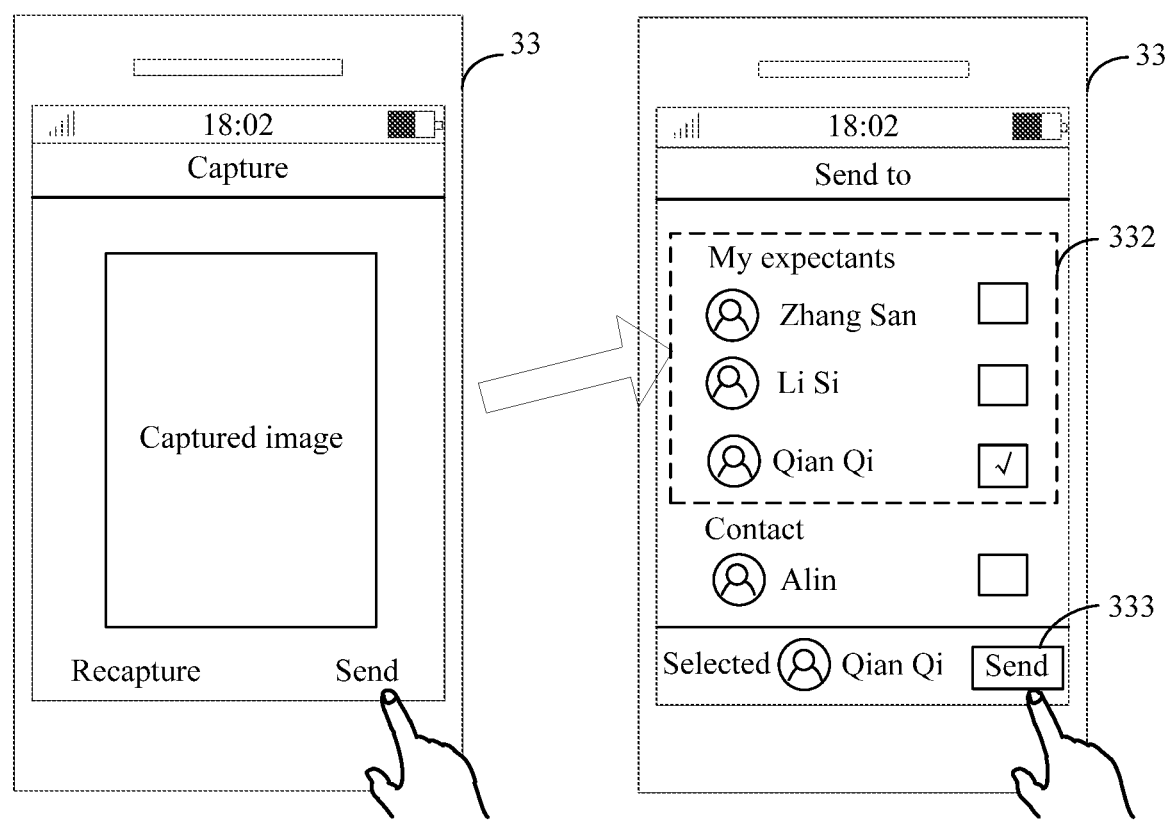
FIG. 3D is a schematic implementation diagram of sending, by a second social client, a social message to a first social client.

Schematically, as shown in FIG. 3D, after a user captures a photo by using the second social client 33, obtains a captured image, and selects to send the captured image, the second social client 33 displays, according to the stored expectation messages (as shown in Table 1), displays an identifier of each first social client (which is specifically a nickname of each expectation user) by using a list 332 "My expectants", and uses a first social client selected by the user as a social-network message receiver. When the user selects "Qian Qi" as the social-network message receiver and clicks a sending button 333, the second social client 33 sends a social-network message to the first social client corresponding to "Qian Qi".

Step 313: The server receives the social-network message sent by the second social client.

Step 314: The server sends the social-network message to the first social client.

In a possible implementation, the server parses the social-network message, obtains the identifier of the first social client included in the social-network message, to send the social-network message to the first social client according to the identifier.

Step 315: The first social client receives the social-network message sent by the server.

In a possible implementation, when the first social client already sends the expectation message to the second social client, but does not receive the social-network message sent by the second social client, the first social client cannot send the expectation message to the second social client again within a second time-limit of the expectation message. For example, the first social client may remove the expectation message sending control corresponding to the second social client or set the expectation message sending control corresponding to the second social client to an operation prohibited state. When receiving the social-network message sent by the second social client, the first social client displays the expectation message sending control corresponding to the second social client again or sets the expectation message sending control corresponding to the second social client to an operational state. Herein, the second time-limit is used to indicate a time-limit in which the first social client sends one expectation message.

Optionally, when the first social client stores an expectation list, after receiving the social-network message sent by the second social client, the first social client deletes the identifier of the second social client from the expectation list.

Step 316: The first social client sends a feedback message to the server.

To exchange information between an expecting party and an expected party, the first social client obtains a feedback message input by the user, and sends the feedback message to the second social client by using the server.

Optionally, the first social client stores historical interaction records. The historical interaction records include a record of interaction with the second social client. The interaction record includes information such as a number of interaction times, an interaction frequency, and interaction duration. After sending the feedback message to the server, the first social client determines that complete information exchange is performed with the second social client, and updates the interaction record corresponding to the second social client in the historical interaction records.

Step 317: The server receives the feedback message sent by the first social client.

Step 318: The server sends the feedback message to the second social client.

Step 319: The second social client receives the feedback message sent by the server.

Optionally, similar to the first social client, the second terminal also stores a historical interaction record. When receiving the feedback message sent by the first social client, the second social client determines that the second social client completely exchanges information with the first social client, and updates an interaction record corresponding to the first social client in the historical interaction records. For example, the second social client performs a plus one operation on a number of interaction times included in the interaction record.

In one embodiment, the first time-limit is set for the expectation message, so that when the first time-limit is reached, the second social client can automatically release the expected state, to avoid impact caused to the user because the second social client has been in the expected state for a long time.

In one embodiment, the second social client targetedly draws up the display policy for the prompt information based on an interaction frequency degree indicated by the historical interaction record by obtaining the historical record of interaction with the first social client, so that the expectation message sent by the first social client that frequently interacts with the second social client can be notably displayed, thereby improving a success rate and efficiency of interaction between the second social client and the first social client.

Figure 4A:
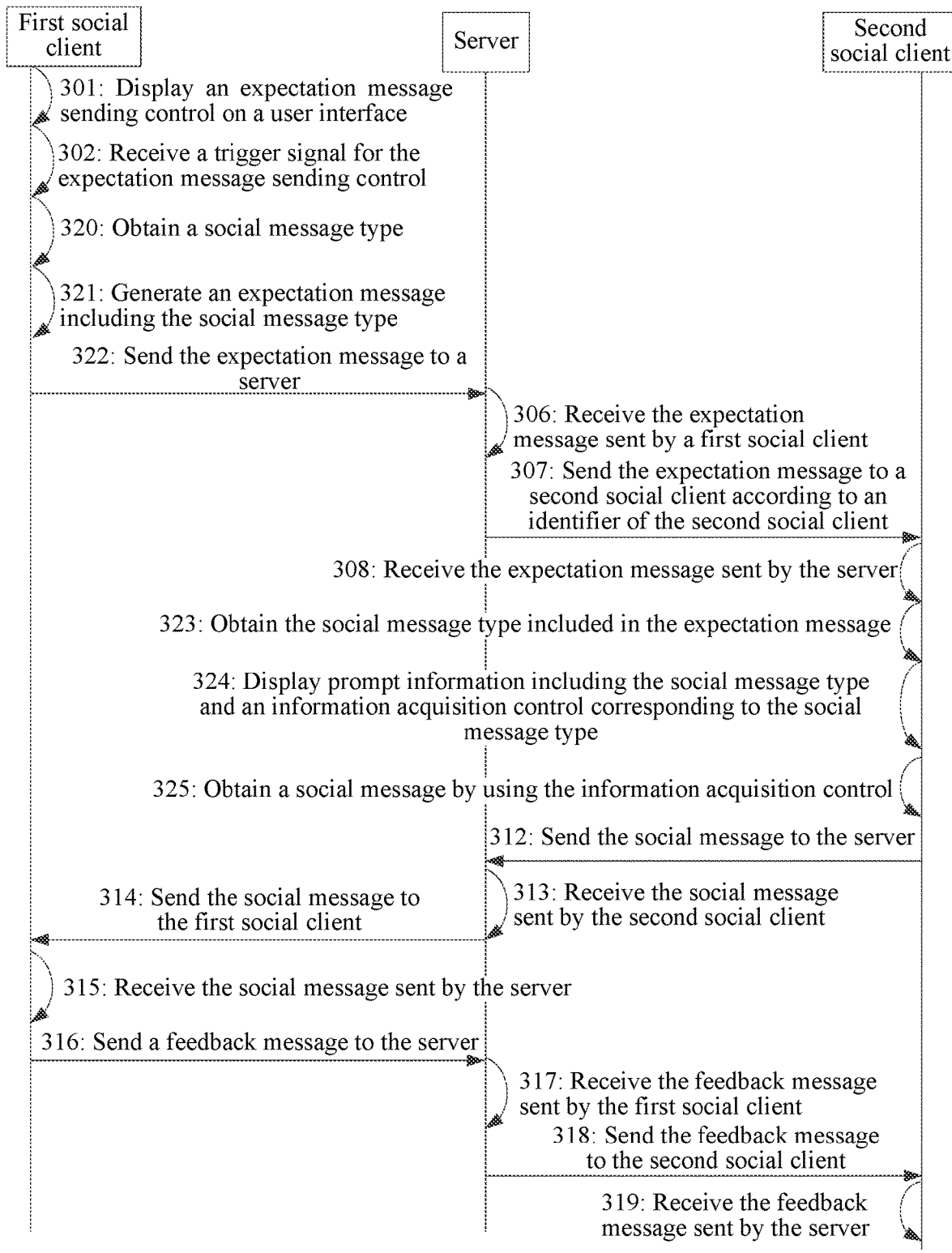
FIG. 4A is a flowchart of an information exchange method according to another embodiment of the present disclosure.

In a possible implementation, the expectation message sent by the first social client further includes the social-network message type, used to indicate a type of the social-network message that the first social client is waiting for the second social client to send. Based on FIG. 3A, as shown in FIG. 4A, Steps 303 to 305 are replaced with Steps 320 to 322.

Step 320: The first social client obtains a social-network message type, and the social-network message type includes at least one of a text, a picture, an audio, or a video.

In a possible implementation, when displaying information about a second social client having a predetermined social-network relationship with the first social client, the first social client provides a corresponding expectation message sending control, and the expectation message sending control is in a representation form of a button or the like. When detecting a click operation on the expectation message sending control, the first social client further displays at least one information type selection control, and receives a predetermined trigger signal by using the information type selection control.

Figure 4B:
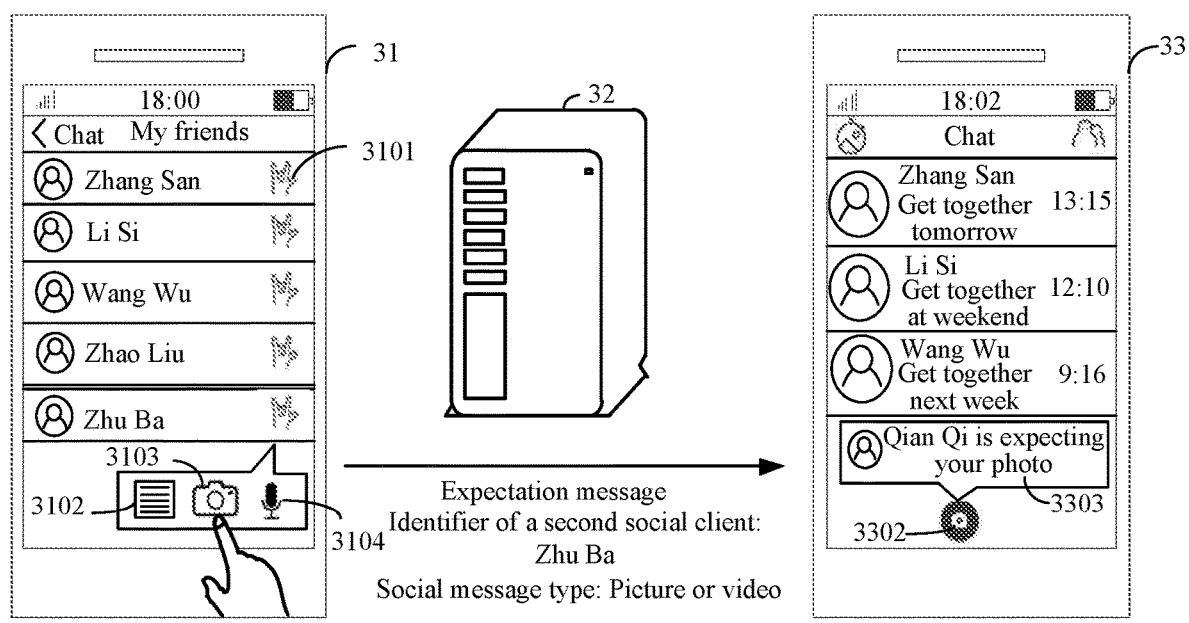
FIG. 4B is a schematic implementation diagram of sending, by a first social client, an expectation message to a second social client in the information exchange method shown in FIG. 4A.

Schematically, as shown in FIG. 4B, in the friend list displayed on the user interface of the first social client 31, friends corresponds to their respective expectation buttons 3101. When receiving a click operation on the expectation button 3101 corresponding to the friend "Zhu Ba", the first social client 31 displays three information type selection controls, which are respectively a text information selection control 3102, a picture/video information selection control 3103, and an audio information selection control 3104. When the user clicks the picture/video information selection control 3103, the first social client 31 determines that a social-network message type indicated by a predetermined trigger signal is a picture/video.

Step 321: The second social client generates an expectation message including the social-network message type.

The second social client generates, according to the determined social-network message type, the expectation message including the social-network message type.

Step 322: The first social client sends the expectation message to the server.

The first social client sends, by using the server, the expectation message carrying the social-network message type to the second social client, so that the second social client informs the user of a type of a social-network message expected by the expecting party.

Schematically, as shown in FIG. 4B, an expectation message sent by the first social client 31 to the server includes the identifier "Zhu Ba" of the second social client and the social-network message type "picture or video".

Correspondingly, after receiving the expectation message, the second social client obtains, by using a corresponding information acquisition control, a social-network message according to the social-network message type carried in the expectation message, and sends the social-network message to the first social client. Based on FIG. 3A, as shown in FIG. 4A, Steps 309 to 311 are replaced with steps 323 to 325.

Step 323: The first social client obtains the social-network message type included in the expectation message.

Schematically, as shown in FIG. 4B, the social-network message type obtained by the second social client 33 from the expectation message is "picture or video".

Step 324: The second social client displays prompt information including the social-network message type and the information acquisition control corresponding to the social-network message type, and the information acquisition control includes at least one of a text acquisition control, an image acquisition control, or an audio acquisition control.

To ensure that the social-network message fed back by the second social client conforms with expectation of the first social client, and improve efficiency of sending the social-network message by the second social client, optionally, the second social client displays, when displaying the prompt information, the corresponding information acquisition control according to the obtained social-network message type.

Schematically, correspondences between social-network message types and information acquisition controls are shown in Table 3.

TABLE 3

| Social-network message type | Information acquisition control |
| --- | --- |
| Text | Text acquisition control |
| Picture/video | Image acquisition control |
| Audio | Audio acquisition control |

Schematically, as shown in FIG. 4B, the second social client 33 displays prompt information 3303 "Qian Qi is expecting your photo" according to the social-network message type "picture or video", and displays an image acquisition control 3302. The prompt information 3303 includes a text "photo" indicating the social-network message type.

Step 325: The second social client obtains the social-network message by using the information acquisition control.

The second social client can acquire data by directly invoking software or hardware by using the information acquisition control, and determine the acquired data as the to-be-sent social-network message.

In a possible implementation, when receiving an operation signal for the text acquisition control, the second social client obtains text information input by using a (virtual or physical) keyboard, and determines the text information as the social-network message. When receiving an operation signal for the image acquisition control, the second social client acquires image frame data by enabling an image acquisition component (such as a camera), and determines the acquired image frame data as the social-network message. When receiving an operation signal for the audio acquisition control, the second social client acquires audio data by enabling an audio acquisition component (such as a microphone), and determines the collected audio data as the social-network message.

In one embodiment, when the expectation message sent by the first social client includes the social-network message type, the second social client displays the corresponding information acquisition control according to the social-network message type, so that the user can rapidly record, by using the information acquisition control, the social-network message that conforms with expectation, and a speed at which the user records the social-network message is accelerated, thereby improving interaction efficiency.

Figure 5A:
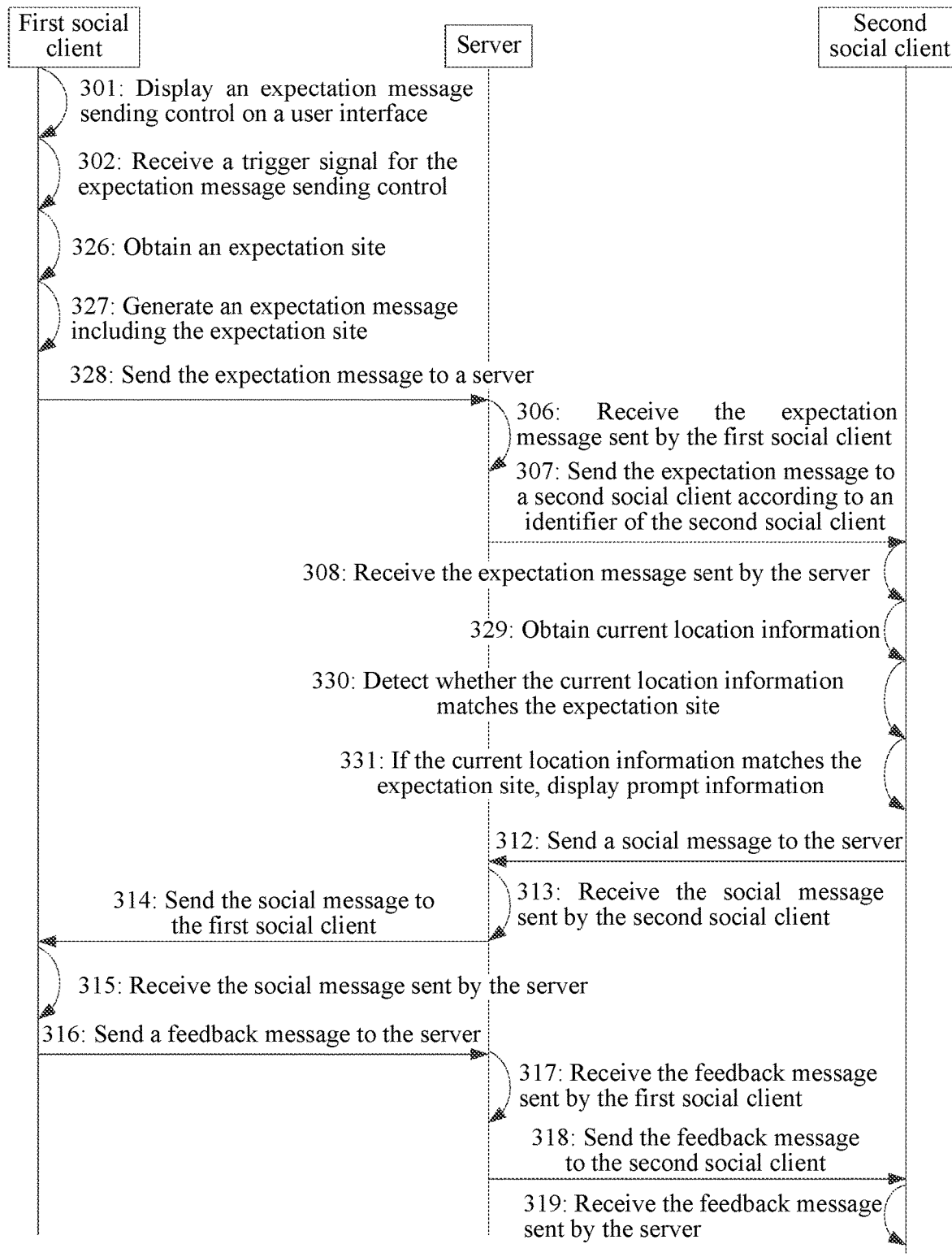
FIG. 5A is a flowchart of an information exchange method according to another embodiment of the present disclosure.

In a possible implementation scenario, the user who use the first social client may instruct, by sending the expectation message, the user of the second social client to exchange information when user of the second social client reaches a specified site. For example, when a user A learns that a user B is going to travel a site C, the user A may send an expectation message to the user B, to instruct the user B to feed back a captured photo after the user B reaches the site C. Based on FIG. 3A, as shown in FIG. 5A, Steps 303 to 305 may be replaced with Steps 326 to 328.

Step 326: The first social client obtains an expectation site.

The expectation site is represented by using latitude and longitude coordinates or a region name (such as a country, province, or city name).

In a possible implementation, when displaying information about a second social client having a predetermined social-network relationship with the first social client, the first social client provides a corresponding expectation message sending control, and the expectation message sending control is in a representation form of a button or the like. When detecting a click operation on the expectation message sending control, the first social client further displays an expectation site selection control, and receives, by using the expectation site selection control, an expectation site input by the user.

Figure 5B:
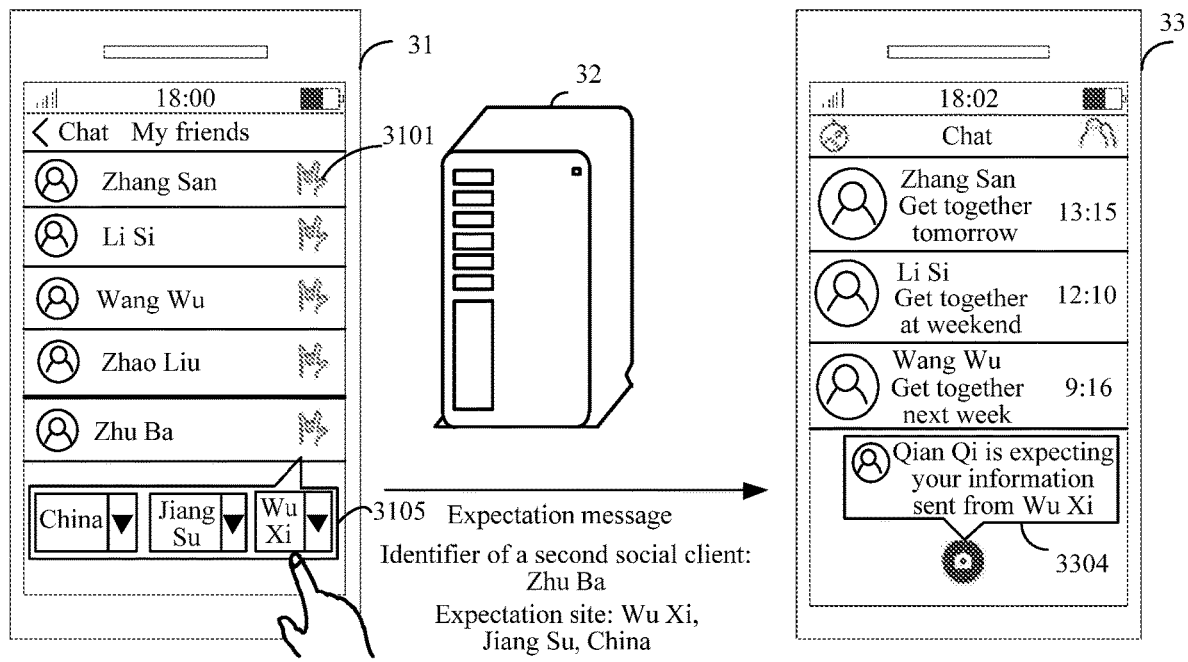
FIG. 5B is a schematic implementation diagram of sending, by a first social client, an expectation message to a second social client in the information exchange method shown in FIG. 5A.

Schematically, as shown in FIG. 5B, in a friend list displayed on a user interface of a first social client 31, friends corresponds to their respective expectation buttons 3101. When receiving a click operation on an expectation button 3101 corresponding to a friend "Zhu Ba", the first social client 31 displays an expectation site selection control 3105, and obtains, by using the expectation site selection control 3105, that an expectation site set by the user is "Wu Xi, Jiang Su, China".

Step 327: The first social client generates an expectation message including the expectation site.

Further, the first social client generates the expectation message according to the expectation site. Schematically, as shown in FIG. 5B, the expectation message generated by the first social client 31 includes the expectation site "Wu Xi, Jiang Su, China".

Step 328: The first social client sends the expectation message to the server.

Schematically, as shown in FIG. 5B, the expectation message sent by the first social client 31 to the second social client 33 by using the server 32 includes the expectation site.

When receiving the expectation message sent by the first social client, to prompt the user to send a social-network message in time, as shown in FIG. 5A, Steps 309 to 311 may be replaced with Steps 329 to 331.

Step 329: The second social client obtains current location information.

After the second social client obtains the expectation message, and detects that the expectation message includes the expectation site, the second social client obtains current location information at a predetermined time interval. Optionally, the current location information is geographical location information, such as latitude and longitude coordinates.

Step 330: The second social client detects whether the current location information matches the expectation site.

Further, the second social client detects whether the current location information matches the expectation site. If the current location information matches the expectation site, the second social client determines that the second social client is located at the expectation site; displays corresponding prompt information, to prompt the user to exchange information with the first social client; and performs Step 331. If the current location information does not match the expectation site, the second social client determines that the second social client does not reach the expectation site, and enters a next round detection.

Step 331: If the current location information matches the expectation site, the second social client displays the prompt information including the expectation site.

For a manner of generating the prompt information, in a possible implementation, the second social client obtains the identifier of the first social client that sends the expectation message and the expectation site, and generates, according to a preset prompt information template, the prompt information including the expectation site. Finally, the prompt information is displayed by using a pop-up window, a drop-down bar, or the like.

Schematically, as shown in FIG. 5B, the second social client obtains an identifier "Qian Qi" of the first social client and an expectation site "Wu Xi", generates prompt information 3304 according to a preset prompt information template "XX (the identifier of the first social client) is expecting your information sent from XX (the expectation site)", which is specifically "Qian Qi is expecting your information sent from Wu Xi", and displays the prompt information 3304 by using a pop-up window.

In one embodiment, by adding the expectation site to the expectation message by the first social client, the second social client can display the corresponding prompt information when reaching the expectation site, to prompt the user to exchange information with the first social client at the expectation site, thereby enriching information exchange modes, and improving information exchange experience of users.

In the foregoing embodiment, the first social client is configured to send an expectation message including an expectation site to a specified second social client, to be specific, the sending of the expectation message is targeted. In another possible implementation scenario, the first social client may alternatively send an expectation message carrying an expectation site to several second social clients through group sending without specifying a specific second social client.

In a possible implementation, a trigger signal received by the first social client is used to instruct to send a same expectation message to at least two second social clients (carrying an expectation site set by the user). When sending the expectation message to the server according to the trigger signal, the first social client first determines the at least two second social clients indicated by the trigger signal, adds identifiers of the at least two second social clients to the expectation message, and sends the expectation message carrying the identifiers of the at least two second social clients to the server. The server sends the expectation message to the second social clients according to the identifiers of the second social clients. Each of the second social clients that receives the expectation message detects whether current location information matches the expectation site, and displays corresponding prompt information when the current location information matches the expectation site, to prompt a local user to be expected at the expectation site.

It should be noted that in the embodiments of the present disclosure, the steps in which the first social client is an execution body may be independently implemented as an information sending method on a first social client side, the steps in which the second social client is an execution body may be independently implemented as an information sending method on a second social client side, and the steps in which the server is an execution body may be independently implemented as an information sending method on a server side. Details are not described herein again.

The following is apparatus embodiments of the present disclosure. For details that are not elaborated in the apparatus embodiments, refer to the foregoing method embodiments that are in a one-to-one correspondence to apparatus embodiments.

Figure 6:
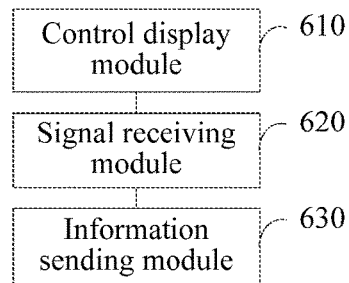
FIG. 6 is a structural block diagram of an information sending apparatus according to an embodiment of the present disclosure.

FIG. 6 is a structural block diagram of an information sending apparatus according to an embodiment of the present disclosure. The information sending apparatus is implemented as all or a part of the first terminal 110 in FIG. 1 by using hardware or a combination of software and hardware. The apparatus includes a control display module 610, a signal receiving module 620, and an information sending module 630.

The control display module 610 is configured to implement Steps 201 and 301, and functions related to control display in the steps.

The signal receiving module 620 is configured to implement Steps 202 and 302, and functions related to signal receiving in the steps.

The information sending module 630 is configured to implement Steps 203, 305, 322, and 329, and functions related to information sending in the steps.

Optionally, the expectation message includes a first time-limit, and the first time-limit is used to indicate, to the second social client, a time-limit for displaying the prompt information.

The apparatus includes a time-limit obtaining module and a first generation module.

The time-limit obtaining module is configured to implement a function of Step 303.

The first generation module is configured to implement a function of Step 304.

Optionally, the expectation message includes a social-network message type, and the social-network message type is used to indicate a type of the social-network message that the first social client is waiting for the second social client to send.

The apparatus includes a type obtaining module and a second generation module.

The type obtaining module is configured to implement a function of Step 320.

The second generation module is configured to implement a function of Step 321.

Optionally, the expectation message includes an expectation site, and the second social client is configured to display the prompt information according to the expectation message when current location information matches the expectation site.

The apparatus includes a site obtaining module and a third generation module.

The site obtaining module is configured to implement a function of Step 327.

The third generation module is configured to implement a function of Step 328.

Figure 7:
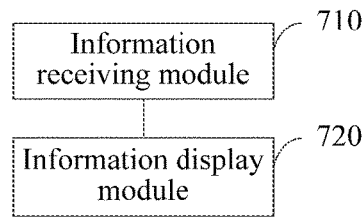
FIG. 7 is a structural block diagram of an information display apparatus according to an embodiment of the present disclosure.

FIG. 7 is a structural block diagram of an information display apparatus according to an embodiment of the present disclosure. The information display apparatus is implemented as all or a part of the second terminal 130 in FIG. 1 by using hardware or a combination of software and hardware. The apparatus includes an information receiving module 710 and an information display module 720.

The information receiving module 710 is configured to implement a function of Step 206 or Step 308.

The information display module 720 is configured to implement a function of Step 207.

Optionally, the expectation message includes a first time-limit.

The apparatus includes a first obtaining module and a first detection module.

The first obtaining module is configured to implement a function of Step 309.

The first detection module is configured to implement a function of Step 310.

The information display module 720 is configured to implement a function of Step 311.

Optionally, the second social client stores a record of interaction with the first social client. The interaction record includes at least one of a number of interaction times, an interaction frequency, or interaction duration.

The information display module 720 includes a second obtaining unit, a second determining unit, and a display unit.

The second obtaining unit is configured to implement a function of Step 311A.

The second determining unit is configured to implement a function of Step 311B.

The display unit is configured to implement a function of Step 311C.

Optionally, the expectation message includes a social-network message type, and the social-network message type includes at least one of a text, a picture, an audio, or a video.

The apparatus includes a second obtaining module, a control display module, and a third obtaining module.

The second obtaining module is configured to implement a function of Step 323.

The control display module is configured to implement a function of Step 324.

The third obtaining module is configured to implement a function of Step 325.

Optionally, the expectation message includes an expectation site.

The apparatus includes a fourth obtaining module and a second detection module.

The fourth obtaining module is configured to implement a function of Step 329.

The second detection module is configured to implement a function of Step 330.

The information display module 720 is configured to implement a function of Step 331.

An embodiment of the present disclosure further provides an information sending apparatus. The information sending apparatus is implemented as all or a part of the server 120 in FIG. 1 by using hardware or a combination of software and hardware. The apparatus includes a receiving module and a sending module.

The receiving module is configured to implement a function of Step 204 or Step 306.

The sending module is configured to implement a function of Step 205 or Step 307.

Figure 8:
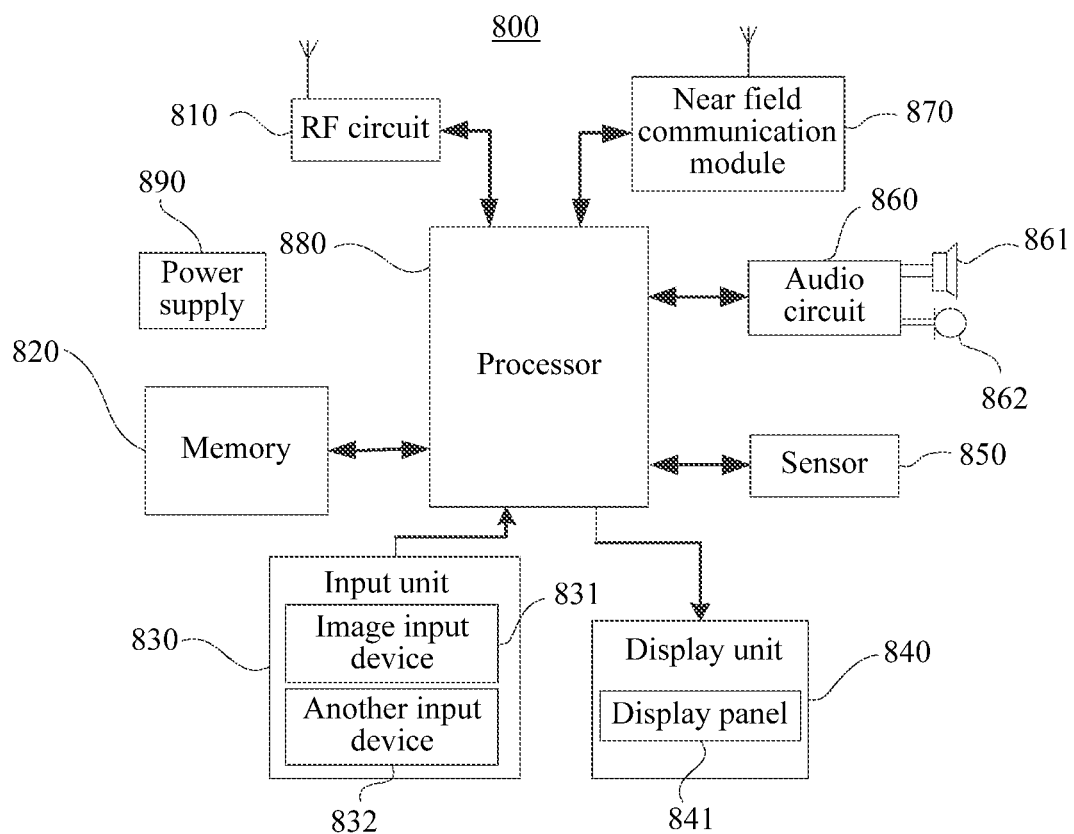
FIG. 8 is a schematic structural diagram of a terminal according to an embodiment of the present disclosure.

FIG. 8 is a schematic structural diagram of a terminal according to an embodiment of the present disclosure. The terminal 800 is the first terminal 110 or the second terminal 130 in FIG. 1. Specifically:

The terminal 800 may include components such as a radio frequency (RF) circuit 810, a memory 820 including one or more computer-readable storage media, an input unit 830, a display unit 840, a sensor 850, an audio circuit 860, a near field communication module 870, a processor 880 including one or more processing cores, and a power supply 890. A person skilled in the art may understand that the structure of the terminal shown in FIG. 8 does not constitute a limitation to the terminal, and the terminal may include more or fewer components than those shown in the figure, or some components may be combined, or a different component deployment may be used.

The RF circuit 810 may be configured to receive and send signals during an information sending and receiving process or a call process. Particularly, the RF circuit receives downlink information from a base station, then delivers the downlink information to one or more processors 880 for processing, and sends related uplink data to the base station. Generally, the RF circuit 810 includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the RF circuit 810 may also communicate with a network and another device through wireless communication. The wireless communication may use any communication standard or protocol.

The memory 820 may be configured to store a software program and module. The processor 880 runs the software program and module stored in the memory 820, to implement various functional applications and data processing. The memory 820 may mainly include a program storage area and a data storage area. The program storage area may store an operating system, an application program required by at least one function (such as a sound playback function and an image display function), and the like. The data storage area may store data (such as audio data and an address book) created according to use of the terminal 800, and the like. In addition, the memory 820 may include a high speed random access memory, and may also include a non-volatile memory, such as at least one magnetic disk storage device, a flash memory, or another volatile solid-state storage device. Correspondingly, the memory 820 may further include a memory controller, so as to provide access of the processor 880 and the input unit 830 to the memory 820.

The input unit 830 may be configured to receive input digit or character information, and generate a keyboard, mouse, joystick, optical, or track ball signal input related to user setting and function control. Specifically, the input unit 830 may include an image input device 831 and another input device 832. The image input device 831 may be a camera, or may be an optoelectrical scanning device. In addition to the image input device 831, the input unit 830 may further include the another input device 832. Specifically, the another input device 832 may include, but is not limited to, one or more of a physical keyboard, a functional key (such as a volume control key or a switch key), a track ball, a mouse, and a joystick.

The display unit 840 may be configured to display information input by the user or information provided for the user, and various graphical user interfaces of the terminal 800. The graphical user interfaces may be composed of graphics, texts, icons, videos, and any combination thereof. The display unit 840 may include a display panel 841. Optionally, the display panel 841 may be configured in a form of a liquid crystal display (LCD), an organic light-emitting diode (OLED), or the like.

The terminal 800 may further include at least one sensor 850, such as an optical sensor, a motion sensor, and other sensors. Another sensor, such as a gyroscope, a barometer, a hygrometer, a thermometer, or an infrared sensor that may be further configured in the terminal 800 is not described in detail herein.

The audio circuit 860, a loudspeaker 861, and a microphone 862 may provide audio interfaces between the user and the terminal 800. The audio circuit 860 may transmit, to the loudspeaker 861, an electric signal converted from received audio data. The loudspeaker 861 converts the electric signal into a sound signal for output. On the other hand, the microphone 862 converts a collected sound signal into an electric signal. The audio circuit 860 receives the electric signal and converts the electric signal into audio data, and outputs the audio data to the processor 880 for processing. Then, the processor 880 sends the audio data to, for example, another electronic device by using the RF circuit 810, or outputs the audio data to the memory 820 for further processing. The audio circuit 860 may further include an earplug jack, to provide communication between a peripheral earphone and the terminal 800.

The terminal 800 establishes a near field communication connection to an external device by using the near field communication module 870, and exchanges data through the near field communication connection. In one embodiment, the near field communication module 870 specifically includes a Bluetooth module and/or a WiFi module.

The processor 880 is a control center of the terminal 800, is connected to various parts of the entire mobile phone by using various interfaces and lines, and by running or executing a software program and/or module stored in the memory 820 and invoking data stored in the memory 820, perform various functions of the terminal 800 and process data, so as to perform overall monitoring on the mobile phone. Optionally, the processor 880 may include one or more processor cores. Preferably, the processor 880 may integrate an application processor and a modem. The application processor mainly processes an operating system, a user interface, an application program, and the like. The modem mainly processes wireless communication. It may be understood that the foregoing modem may alternatively not be integrated into the processor 880.

The terminal 800 further includes the power supply 890 (such as a battery) for supplying power to the components. Preferably, the power supply may be logically connected to the processor 880 by using a power management system, thereby implementing functions such as charging, discharging, and power consumption management by using the power management system.

Although not shown in the figure, the terminal 800 may further include a Bluetooth module and the like. Details are not further described herein.

Specifically, in one embodiment, the terminal 800 further includes a memory and one or more programs. The one or more programs are stored in the memory, and are configured to be performed by one or more processors to implement the foregoing information sending method on a first terminal side and the foregoing information display method on a second terminal side.

A person of ordinary skill in the art may understand that all or some of the steps in the information sending method and the information display method in the foregoing embodiments may be implemented by a program instructing relevant hardware. The program may be stored in a computer-readable storage medium. The storage medium may include: a read-only memory (ROM), a random access memory (RAM), a magnetic disk, an optical disc, or the like.

Figure 9:
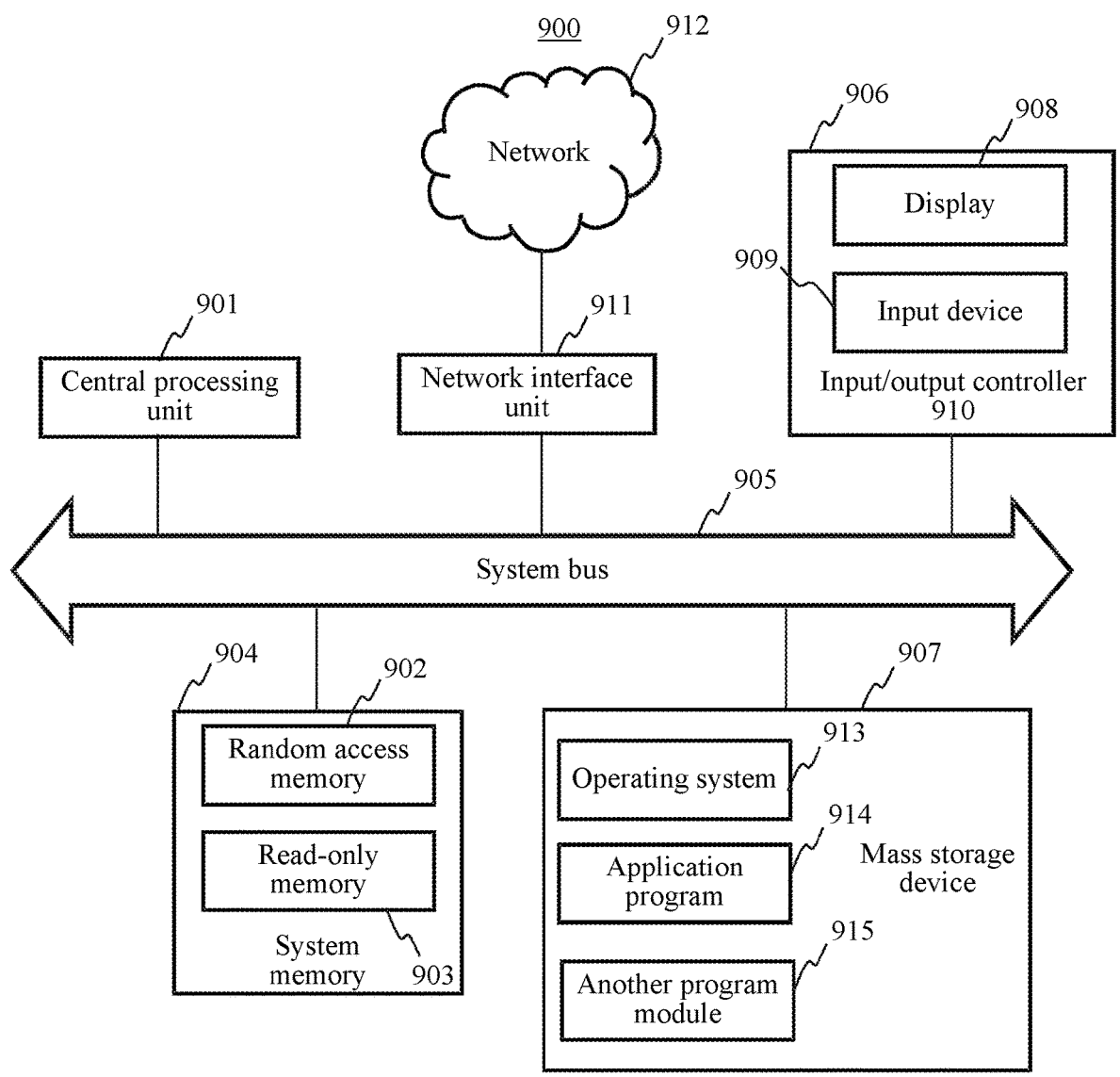
FIG. 9 is a schematic structural diagram of a server according to an embodiment of the present disclosure.

FIG. 9 is a structural block diagram of a server according to an embodiment of the present disclosure. The server 900 is implemented as the server 120 in FIG. 1. Specifically:

The server 900 includes a central processing unit (CPU) 901, a system memory 904 including a RAM 902 and a ROM 903, and a system bus 905 connecting the system memory 904 and the CPU 901. The server 900 further includes a basic input/output system (I/O system) 906 used for transmitting information between components in a computer, and a mass storage device 907 used for storing an operating system 913, an application program 914, and another program module 915.

The basic I/O system 906 includes a display 908 configured to display information, and an input device 909, such as a mouse or a keyboard, used by a user to input information. The display 908 and the input device 909 are connected to the CPU 901 by using an input/output controller 910 connected to the system bus 905. The basic I/O system 906 may further include the input/output controller 910, to receive and process inputs from a plurality of other devices, such as the keyboard, the mouse, or an electronic stylus. Similarly, the input and output controller 910 further provides an output to a display screen, a printer, or another type of output device.

Without loss of generality, the computer-readable medium may include a computer storage medium and a communication medium. The computer storage medium includes volatile and non-volatile media, and removable and non-removable media implemented by using any method or technology and configured to store information such as a computer-readable instruction, a data structure, a program module, or other data.

The memory further includes one or more programs, the one or more programs are stored in the memory, and the one or more programs include an instruction used for performing the information sending method on the server side according to the embodiments of the present disclosure.

A person of ordinary skill in the art may understand that all or some of the steps of the information sending method in the foregoing embodiments may be implemented by a program instructing relevant hardware. The program may be stored in a computer-readable storage medium. The storage medium may include: a ROM, a RAM, a magnetic disk, an optical disc, or the like.

The sequence numbers of the foregoing embodiments of the present disclosure are merely for descriptions, and are not intended to indicate the preference of the embodiments.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. An information sending method, comprising:
   displaying, by a first social client, an expectation message sending control on a user interface, the expectation message sending control corresponding to at least one second social client;
   receiving a trigger signal for the expectation message sending control; and
   sending an expectation message to a server according to the trigger signal, the expectation message including an identifier of the at least one second social client and a predetermined identifier bit, to cause the server to detect the predetermined identifier bit and to identify the expectation message according to the predetermined identifier bit as detected, and to cause the server to forward the expectation message to the at least one second social client, wherein
   the expectation message as forwarded by the server causes the at least one second social client to display prompt information according to the expectation message, and the prompt information is of a preset template format and used to indicate that the first social client is expecting the at least one second social client to send a social-network message to the first social client.

2. The method according to claim 1, wherein the expectation message further comprises a first time-limit, and the first time-limit is used to indicate, to the at least one second social client, a time-limit for displaying the prompt information; and the method further comprises:
   obtaining the first time-limit; and
   generating the expectation message comprising the first time-limit.

3. The method according to claim 2, wherein the the at least one second social client is further caused to perform:

obtaining the first time-limit comprised in the expectation message;

detecting whether a current moment is within the first time-limit; and displaying the prompt information if the current moment is within the first time-limit.

4. The method according to claim 1, further comprising:

having the predetermined identifier bit set at a header of the expectation message.

5. The method according to claim 1, further comprising:

in response to receiving the trigger signal for the expectation message sending control, displaying a set of information type selection controls, wherein the set of information type selection controls includes a text information selection control, a picture/video information selection control, and an audio information selection control.

6. The method according to claim 5, further comprising:

upon a triggering of one or more of the text information selection control, the picture/video information selection control, and the audio information selection control, including in the expectation message the one or more of the text information selection control, the picture/video information selection control, and the audio information selection control.

7. The method according to claim 1, further comprising:

displaying the prompt information in a pop-up window, a floating window, or a drop-down bar.

8. The method according to claim 1, wherein the expectation message further comprises an expectation site, and the expectation site is used to instruct, when current location information matches the expectation site, the at least one second social client to display the prompt information; and the method further comprises:

obtaining the expectation site; and generating the expectation message comprising the expectation site.

9. The method according to claim 8, wherein the displaying, by each at least one second social client is further caused to perform:

obtaining current location information;

detecting whether the current location information matches the expectation site; and displaying the prompt information if the current location information matches the expectation site.

10. An information exchange apparatus, comprising: a memory; and a processor coupled to the memory, the processor being configured to perform:

displaying, by a first social client, an expectation message sending control on a user interface, the expectation message sending control corresponding to at least one second social client;

receiving a trigger signal for the expectation message sending control; and sending an expectation message to a server according to the trigger signal, the expectation message including an identifier of the at least one second social client and a predetermined identifier bit, to cause the server to detect the predetermined identifier bit and to identify the expectation message according to the predetermine identifier bit as detected, and to cause the server to forward the expectation message to the at least one second social client, wherein the expectation message as forwarded by the server causes the at least one second social client to display prompt information according to the expectation message, and-the prompt information is of a preset template format different than a format for a social-network message and indicates that the first social client is expecting the at least one second social client to send the social-network message to the first social client.

11. The information exchange apparatus according to claim 10, wherein the expectation message further comprises a first time-limit, and the first time-limit is used to indicate, to the at least one second social client, a time-limit for displaying the prompt information; and the processor is further configured to perform:

obtaining the first time-limit; and generating the expectation message comprising the first time-limit.

12. The information exchange apparatus according to claim 11, wherein the at least one second social client is further caused to perform:

obtaining the first time-limit comprised in the expectation message;

detecting whether a current moment is within the first time-limit; and displaying the prompt information if the current moment is within the first time-limit.

13. The information exchange apparatus according to claim 10, wherein the expectation message further comprises an expectation site, and the expectation site is used to instruct, when current location information matches the expectation site, the at least one second social client to display the prompt information; and the processor is further configured to perform:

obtaining the expectation site; and generating the expectation message comprising the expectation site.

14. The information exchange apparatus according to claim 13, wherein the at least one second social client is further caused to perform:

obtaining current location information;

detecting whether the current location information matches the expectation site; and displaying the prompt information if the current location information matches the expectation site.

15. The apparatus according to claim 10, wherein the processor is further configured to perform:

having the predetermined identifier bit set at a header of the expectation message.

16. The apparatus according to claim 10, wherein the processor is further configured to perform:

in response to receiving the trigger signal for the expectation message sending control, displaying a set of information type selection controls, wherein the set of information type selection controls includes a text information selection control, a picture/video information selection control, and an audio information selection control.

17. A non-transitory computer-readable storage medium storing computer program instructions executable by at least one processor to perform:

displaying, by a first social client, an expectation message sending control on a user interface, the expectation message sending control corresponding to at least one second social client; receiving a trigger signal for the expectation message sending control; and sending an expectation message to a server according to the trigger signal, the expectation message including an identifier of the at least one second social client and a predetermined identifier bit, to cause the server to detect the predetermined identifier bit and to identify the expectation message according to the predetermined identifier bit as detected, and to cause the server to forward the expectation message to the at least one second social client, wherein the expectation message as forwarded by the server causes the at least one second social client to display prompt information according to the expectation message, and the prompt information is of a preset template format and used to indicate that the first social client is expecting the second social client to send a social-network message to the first social client.

18. The storage medium according to claim 17, wherein the expectation message further comprises a first time-limit, and the first time-limit is used to indicate, to the at least one second social client, a time-limit for displaying the prompt information; and the computer program instructions further cause the at least one processor to perform:

obtaining the first time-limit; and generating the expectation message comprising the first time-limit.

19. The storage medium according to claim 18, wherein the the at least one second social client is further caused to perform:

obtaining the first time-limit comprised in the expectation message;

detecting whether a current moment is within the first time-limit; and displaying the prompt information if the current moment is within the first time-limit.

20. The storage medium according to claim 17, wherein the storing computer program instructions are further executable by the at least one processor to perform:

having the predetermined identifier bit set at a header of the expectation message.

* * * * *